United States Patent
Steindl

(10) Patent No.: US 6,687,551 B2
(45) Date of Patent: Feb. 3, 2004

(54) AUDIO-ACTIVE COMMUNICATION STATIONS, COMMUNICATION METHOD AND COMMUNICATION SYSTEM WITH AUDIO-ACTIVE COMMUNICATION STATIONS

(75) Inventor: Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,298

(22) PCT Filed: Jan. 28, 1998

(86) PCT No.: PCT/EP98/00456
§ 371 (c)(1),
(2), (4) Date: Oct. 27, 1999

(87) PCT Pub. No.: WO98/35275
PCT Pub. Date: Aug. 13, 1998

(65) Prior Publication Data
US 2003/0050715 A1 Mar. 13, 2003

(30) Foreign Application Priority Data
Feb. 10, 1997 (EP) ............................................. 97102093

(51) Int. Cl.⁷ .............................................. G05B 15/00
(52) U.S. Cl. .............................. 700/1; 700/90; 700/201
(58) Field of Search ............................... 370/356, 403, 370/432, 475; 702/182; 700/1, 2, 90, 201; 709/201

(56) References Cited

U.S. PATENT DOCUMENTS

| | | | | |
|---|---|---|---|---|
| 4,926,375 A | * | 5/1990 | Mercer et al. | 709/201 |
| 5,136,580 A | * | 8/1992 | Videlock et al. | 370/403 |
| 5,280,477 A | * | 1/1994 | Trapp | 370/356 |
| 5,351,243 A | * | 9/1994 | Kalkunte et al. | 370/475 |
| 5,980,078 A | * | 11/1999 | Krivoshein et al. | 700/1 |
| 6,026,352 A | * | 2/2000 | Burns et al. | 702/182 |
| 6,147,976 A | * | 11/2000 | Shand et al. | 370/254 |
| 6,510,151 B1 | * | 1/2003 | Cioli et al. | 370/352 |

FOREIGN PATENT DOCUMENTS

| | | |
|---|---|---|
| EP | 0 183 273 | 6/1986 |
| GB | 2 064 920 | 6/1981 |
| GB | 2 148 563 | 5/1985 |

OTHER PUBLICATIONS

R. Hulsebos, "Veldbussen", 1996, Kluwer Techniek, Listed in the International Search Report.
Patent Abstracts of Japan, vol. 007, No. 192 (P–218) Aug. 23, 1983, & JP 58 092006 (Tokyo Shibaura Denki KK).
Patent Abstracts of Japan, vol. 014, No. 297 (E–0945), Jun. 27, 1990 & JP 02 094848 (Yaskawa Electric Mfg Co. Ltd.).

* cited by examiner

Primary Examiner—Leo Picard
Assistant Examiner—Alexander Kosowski
(74) Attorney, Agent, or Firm—Staas & Halsey LLP

(57) ABSTRACT

A communication subscriber which, as a passive subscriber of a communication system, does not have its own transmission authorization but listens to all the communication processes and can receive only those data items which are also intended for it, which can be identified without doubt from destination identifier allocated to the data items, is given the capability, according to the invention, also to receive in addition those data items whose destination identifier and source identifier match an entry in a filter table provided in the communication subscriber which has been given the capability according to the invention.

8 Claims, 4 Drawing Sheets

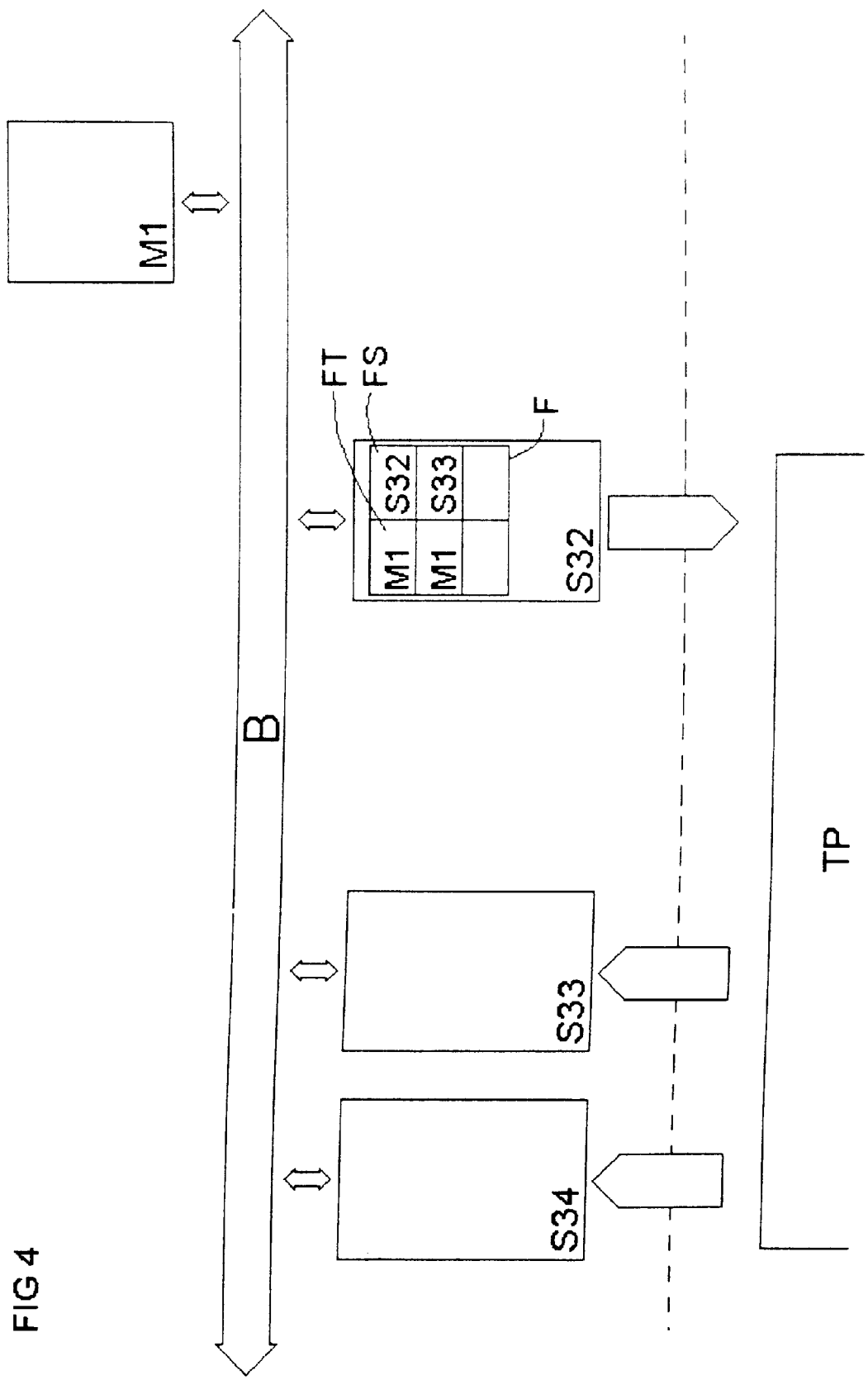

AUDIO-ACTIVE COMMUNICATION STATIONS, COMMUNICATION METHOD AND COMMUNICATION SYSTEM WITH AUDIO-ACTIVE COMMUNICATION STATIONS

BACKGROUND INFORMATION

Communication systems, such as the Profibus, as is described in DIN Standards 19245 Part 1 and 19245 Part 2 and in the document by Peter Neumann: Kommunikationssysteme in der Automatisierungstechnik, [Communication systems in automation engineering], Verlag Technik, Berlin, are used to provide the information interchange between various subsystems in a technical installation.

One special feature in this context is real-time data interchange as is required, for example, for process monitoring or for automatic control of technical systems. Profibus (Process Field Bus) is a standardization method that is used by automation companies and scientific organizations in the Federal Republic of Germany.

Profibus is a fieldbus system and is thus used, in the narrow sense, for standardized connection of automation devices in the field area.

The areas in which Profibus is used include, for example, autonomous use as a process data bus system for automation projects or as a subordinate communication level in process control systems. The communication or bus subscribers may be programmable logic controllers or control systems, numeric controllers or control systems, a local automation device or sensors and/or actuators with bus interfaces.

Each bus subscriber is a terminal of the communication system. As such, each subscriber has a communication means which allows the subscriber to be connected to the communication system, the bus. The communication means, which may have its own processor or a so-called ASIC, controls the transmission processes independently of the other subscriber actions.

The data interchange between the communication means and the terminal takes place, for example, by virtue of the fact that part of the memory in the terminal is mapped, virtually as a "window" across to the memory provided in the communication means. This method is called shared memory or memory mapped I/O. Data from the bus are buffered in the storage area provided for this purpose in the communication means. The terminal's control unit can then read the data directly from the communication means as if said data were already stored in its own main memory.

For Profibus, a distinction is drawn between a physical topology and a logic topology. The physical topology is defined by a line interface in accordance with RS-485. Thus, the Profibus is a serial bus. In contrast, the logic topology corresponds on the one hand, to specific bus subscribers being linked in a ring, these subscribers being called active subscribers in the following text, and on the other hand, to in each case one active subscriber being linked in the form of a star to the other bus subscribers which are not included in this linking in the form of a ring, and which are called passive subscribers in the following text.

The authorization for bus access among the active bus subscribers is allocated in accordance with an identification method, the most common method being the token ring method. The token, a specific bit pattern which acts as an identification, is passed on from one active subscriber to the next active subscriber corresponding to the logic linking in the form of a ring. The active subscriber which has the token internally has access authorization to the medium, this authorization allowing access to the bus either for a limited time or for a fixed number of transmission processes.

Logic linking in the form of a star exists between, in each case, one active subscriber and one or more passive subscribers. The active subscriber in such a link in the form of a star is called the master in the following text. Data is retrieved from the passive bus subscribers by means of a global function which is implemented in the respective active subscriber. This retrieval is called polling in the following text. A passive subscriber may not access the medium (transmit data) until it is granted "permission" (polling) by the respective active subscriber.

A disadvantage of the conventional communication method is that it is impossible for passive communication subscribers which do not have their own transmission authorization to interchange data directly.

SUMMARY

An, the object of the present invention is to provide a passive communication subscriber which has the capability to receive directly a data item transmission via the bus from another passive communication subscriber.

This object is achieved by providing a listening communication subscriber (S32–S34) for connection to a bus system (B) for industrial control systems, in particular a bus system (B) with programmable logic controllers, in which a data item which is to be transmitted via the bus having at least one destination identifier and one source identifier, the listening communication subscriber having its own identifier, a filter table having at least one entry in each case having at least two parameters being provided for the listening communication subscriber, the first parameter representing a destination identifier, the second parameter representing a source identifier, the listening communication subscriber in each case receiving a data item on the one hand when the destination identifier of the data item matches with its own identifier and the listening communication subscriber in each case, on the other hand, receiving a data item when the destination identifier and the source identifier of the data item match the corresponding parameters of an entry in the filter table.

According to an advantageous refinement, the listening communication subscriber is provided with a buffer storage area in which a received data item can be buffered and from which the data item can be transferred to an input storage area as soon as it is found that the received data item is intended for the respective listening communication subscriber. This allows the data transmitted via the bus to be stored temporarily with the capability to evaluate the destination and source identifiers of the received data item within the buffer storage area, so that only one data item, which is actually intended for the respective listening communication subscriber, is transferred to its input memory area so that, the processing and evaluation of the wanted data in the received data item are not influenced by the configuration according to the invention of the listening communication subscriber.

A further object of the present invention is to provide a communication system in which a data item which has been transmitted via the bus by a first passive communication subscriber can be received directly by another passive communication subscriber.

The object is achieved in that, in a communication system which is formed by a bus system for industrial control systems, in particular a bus system having programmable logic controllers, and has active communication subscribers and passive communication subscribers, at least one of the passive communication subscribers is a listening communication subscriber,

- a data item which is to be transmitted via the bus having at least one destination identifier and one source identifier,
- the listening communication subscriber (S32–S34) having its own identifier (K),
- a filter table having at least one entry in each case having at least two parameters being provided for the listening subscriber,
- the first parameter representing a destination identifier,
- the second parameter representing a source identifier,
- the listening communication subscriber in each case receiving a data item on the one hand when the destination identifier of the data item matches with its own identifier, and
- the listening communication subscriber in each case, on the other hand, receiving a data item when the destination identifier and the source identifier of the data item match the corresponding parameters of an entry in the filter table.

In a communication system having active communication subscribers and passive communication subscribers and which is formed by a bus system for industrial control systems, in particular a bus system having programmable logic controllers, the listening communication subscriber according to the present invention can be used advantageously since a listening communication subscriber designed according to the invention can handle the communication processes within the communication system more effectively.

In an advantageous refinement of the communication system, the listening communication subscriber is distinguished by the fact that it is provided with a buffer storage area in which a received data item can be buffered and from which the data item can be transferred to an input storage area as soon as it is found that the received data item is intended for the respective listening communication subscriber. The advantages for the individual communication subscriber configured according to the present invention also apply analogously to the communication system in which the communication subscriber is used.

A further object of the present invention is to provide a communication method which allows at least direct communication between passive communication subscribers.

This object is achieved by providing a communication method for a listening communication subscriber (S32–S34) for connection to a bus system (B) for industrial control systems, in particular a bus system (B) with programmable logic controllers, a data item (D) which is to be transmitted via the bus (B) having at least one destination identifier (T) and one source identifier (S), the listening communication subscriber (S32–S34) having its own identifier (K), and a filter table (F) having at least one entry in each case having at least two parameters ($FT_x$, $FS_x$) being provided for the listening communication subscriber (S32–S34), the first parameter ($FT_x$) representing a destination identifier (T) and the second parameter ($FS_x$) representing a source identifier (S), and the method comprising at least the following steps:

- the listening communication subscriber (S32–S34) in each case receives a data item (D) on the one hand when the destination identifier (T) of the data item (D) matches its own identifier (K), and
- the listening communication subscriber (S32–S34) in each case receives a data item (D) on the other hand when the destination identifier (T) and the source identifier (S) of the data item (D) match the corresponding parameters ($FT_x$, $FS_x$) of an entry in the filter table (F).

In an advantageous refinement of the communication method, a buffer storage area is provided in which a received data item is buffered and from which the data item is transferred to an input storage area as soon as it is found that the received data item is intended for the respective listening communication subscriber. The advantages for the individual communication subscriber configured according to the invention also apply analogously to the communication method.

The solutions and their refinements according to the present invention can advantageously be used with a serial bus, in particular the Profibus, as the bus system. A serial bus allows interference-free data transmission even over long distances and is thus particularly suitable for use in industrial environments. The Profibus has been proven for use in automation projects and, thus, is in widespread use.

BRIEF DESCRIPTION OF THE DRAWINGS

Figure shows a bus subscriber and communication system (bus) for Profibus.

Figure shows a format of a data item.

Figure 1:
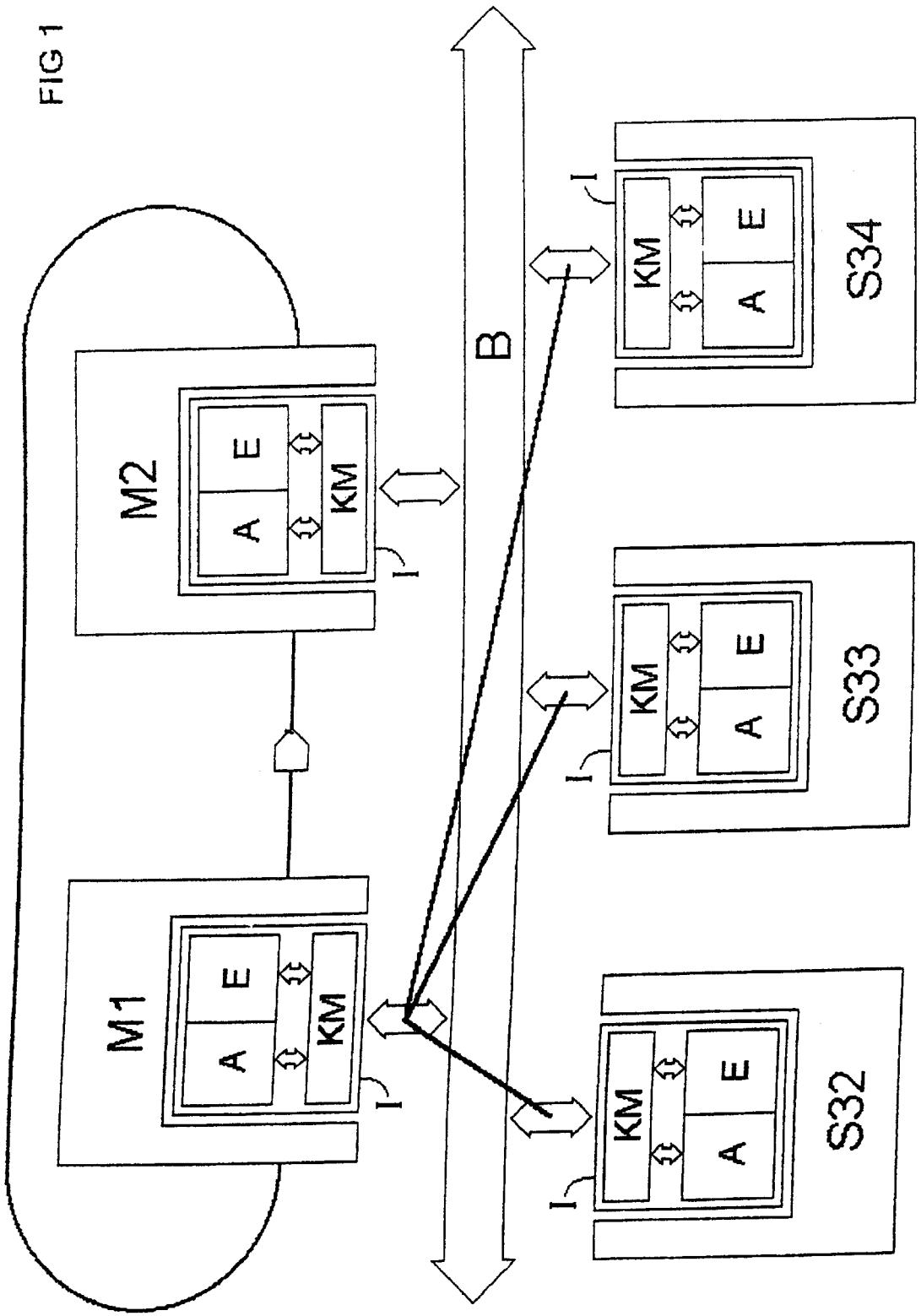
Figure 2:
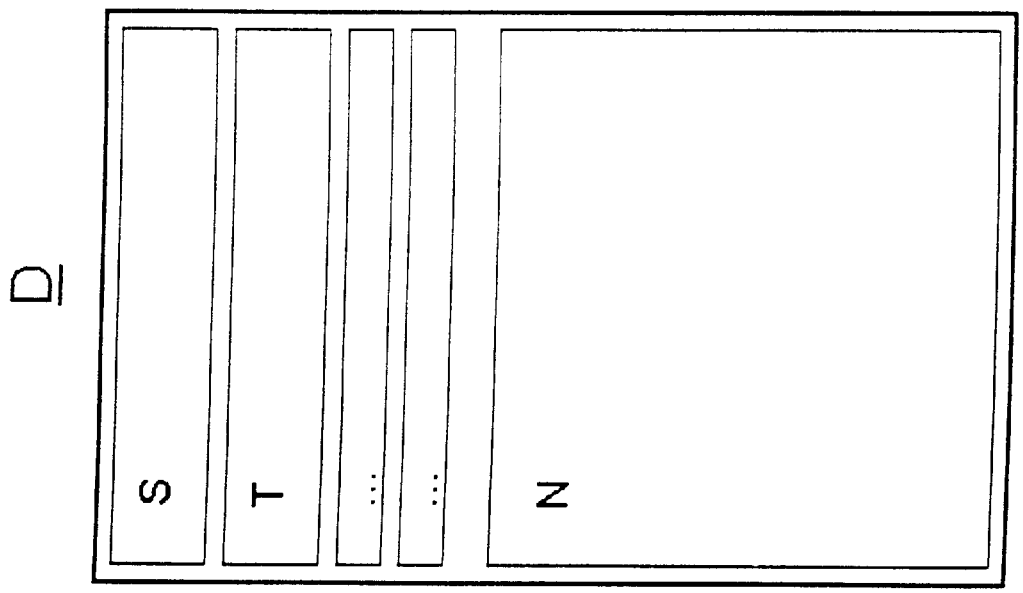

Figure shows bus subscribers which have been given the capability to carry out the method according to the present invention Figure shows subscribers to an exemplary communication process according to the present invention.

DETAILED DESCRIPTION

According to Figure, a plurality of active subscribers M1, M2 and passive subscribers S32, S33, S34 are connected to a line bus B. In this example, the bus protocol is assumed to be Profibus-DP. The subscribers M1, M2, S32–S34 are assumed to be automation devices for controlling and/or monitoring a technical process. The active subscribers M1, M2 are assumed to be central processors in a programmable logic control system (PLC). The passive subscribers S32–S34 are assumed to be sensors or actuators and/or local automation devices with bus interfaces, for example for outputting or receiving status information relating to the technical process. The technical process is monitored and controlled by the control program predetermined by the active subscribers M1, M2. In particular, the respective structure of the control program governs the nature and direction of the data flow via the bus.

The prior art does not envisage direct communication between the passive subscribers S32–S34; instead of this, communications are envisaged in which the active subscriber M1, M2 retrieves data from the respective passive subscriber S32–S34 or transmits data to the respective passive subscriber S32–S34.

If, nevertheless, data which is available in the region of a first passive subscriber, for example S33, is intended to be transferred to a second passive subscriber, for example S32, then this is done by including at least one active bus subscriber, for example M1.

The following text describes a communication process in which a data item D which is available in the region of a first passive bus sub-scriber S33 is intended to be transmitted to a second bus subscriber S32. Unless specifically mentioned to the contrary, the further explanation of an exemplary embodiment of the invention refers back to this constellation.

The active bus subscriber retrieves a data item D, for example a data record or an input value, from the passive bus subscriber S33. To do this, the active bus subscriber M1 sends to the passive bus subscriber S33 a specific data item D which causes the latter to transmit the data item D to be transmitted to the active bus subscriber M1.

Each data item D to be transmitted is—in accordance with the bus protocol specifications—supplemented at least by information about the receiver (the destination identifier T) and the sender (the source identifier S). Thus, a data item D comprises at least the destination identifier T, the source identifier S and the actual wanted data N. Figure shows an illustration by way of example of the structure of the data item resulting from this. The addressee of a data item D can be identified uniquely by the destination identifier T. In the present case, the addressee is thus the active subscriber M1, which receives the data item D and can thus evaluate it.

The control program predetermined by the active subscriber M1 defines—independently of the specific communication process—the processing and handling of the wanted data N in the received data item D. In the context of the example communication process, the intention is to transfer the wanted data N to the passive subscriber S32. A data item D which is transmitted to the passive subscriber S32 is thus generated in the region of the active subscriber M1. In this way, the message sent by the slave S33 finally arrives at the slave S32.

The physical transmission of the data is accomplished in a conventional manner. In order to organize the data transmission, at least one input area E and at least one output area A are provided in each case for each bus subscriber M1, M2, S32–S34, that is to say for both the active and passive bus subscribers, as illustrated in Figure.

A data item D to be transmitted is in each case stored in the output area A of the respective bus subscriber M1, M2, S32–S34, and can thus be transmitted via the bus B. At the receiver M1, M2, S32–S34 of the transmitted data item D, the data item D is transferred to the receiver's input area E.

As soon as the receiver M1, M2, S32–S34 registers the presence of the data item D in its input area E, the received data item D can be evaluated. The evaluation relates at least to the destination identifier T contained in the data item D. If the destination identifier T matches the respective identifier of the receiver, then the data item has arrived at its destination address.

This explains the communication principle between passive bus subscribers S32–S34 which do not have any transmission authorization. The messages between two passive bus subscribers, for example S32 and S33, are always diverted via an active bus subscriber M1.

For communication processes between passive bus subscribers S32–S34, the present invention avoids the disadvantageous diversion via an active bus subscriber M1, M2.

To this end, a passive bus subscriber S32–S34 is given the capability to "eavesdrop" on the transmissions taking place via the bus B. As a result of this eavesdropping, it is possible for a passive bus subscriber S32–S34—for example the slave S32—to receive the respective data item D currently being transmitted via the bus B, irrespective of whether this data item is intended for it.

The communication device KM provided for each bus subscriber M1, M2, S32–S34 and for the respective interface I still monitors the transmissions via the bus for the communication process described further above, but is designed such that only one data item D, whose destination identifier T matches the identifier of the respective bus subscriber, is received.

According to the present invention, the communication device KM is, in contrast, refined in such a manner that it is able to receive every data item D which is transmitted via the bus B. This allows efficient communication between passive bus subscribers S32–S34, and this will be described in the following text with reference to FIG. 3 and FIG. 4.

A data item D which is intended to be transmitted from the slave S33 to the slave S32 is first of all transmitted to an active subscriber M1, M2—for example the master M1. The data item D is in this case supplemented at least by the destination identifier T of the recipient, in this case, that of the master M1, and the source identifier S of the sender, in this case that is to say that of the passive subscriber S33.

Figure 3:
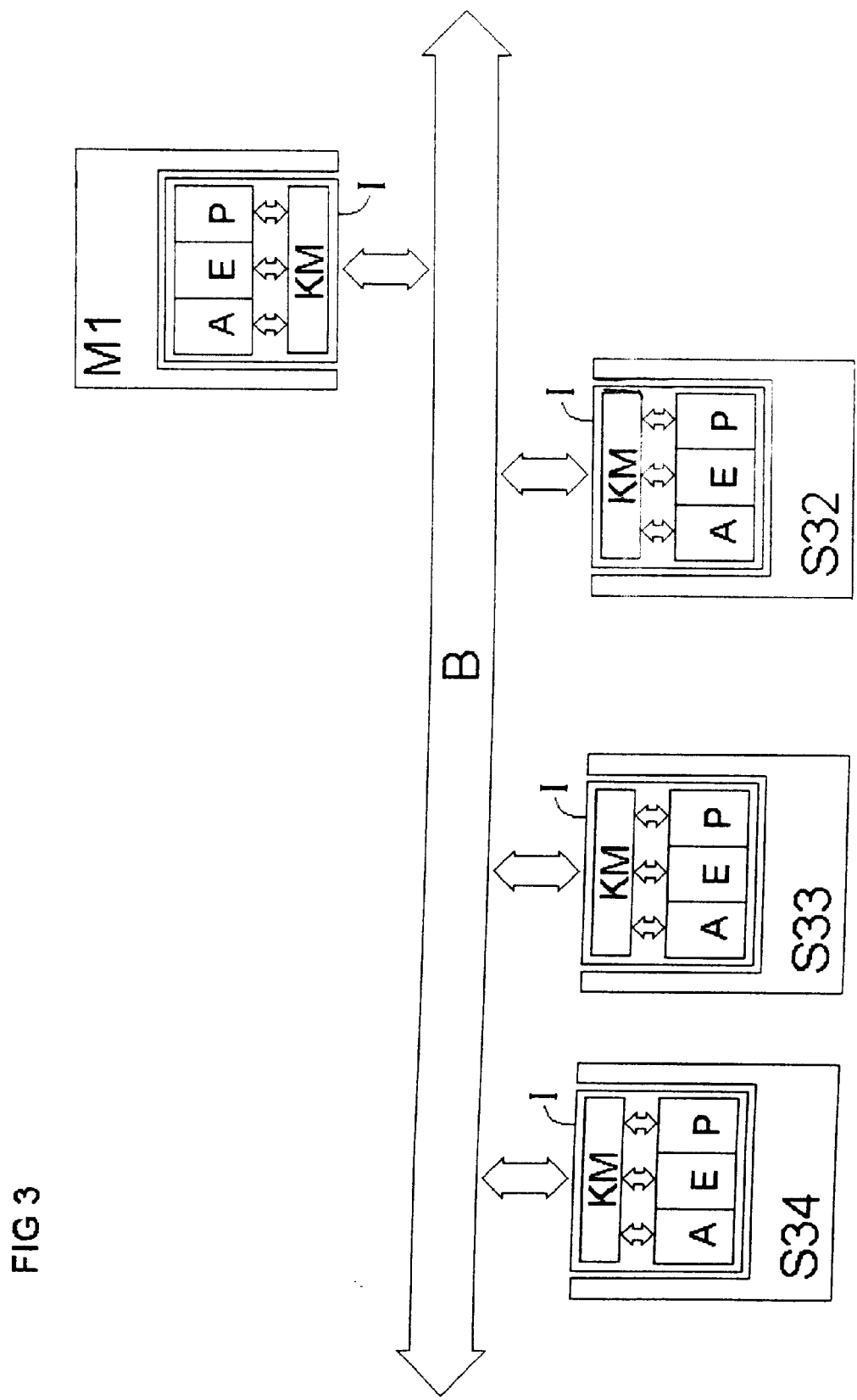

The passive bus subscribers S32–S34 now eavesdrop on the transmission and, in the process, transfer the data item D to a buffer storage area P (FIG. 3).

As soon as a passive bus subscriber S32–S34 registers the presence of a data item D in its buffer storage area P, the data item can be evaluated. This evaluation, in the case of the communication method according to the present invention and in the case of the communication subscriber S32–S34 which has been given the capability according to the present invention, relates to the destination identifier T and to the source identifier S of the data item D.

According to the present invention, a filter table F can be defined in advance for the respective passive bus subscriber S32–S34, in order to evaluate the destination identifier T and the source identifier S of a data item D (FIG. 4). Each entry in this filter table F has at least two parameters FT, FS, the two parameters designating the address of a communication subscriber, the first parameter FT, for example, designating the recipient M1, M2, S32–S34 of a data item D, and the second parameter FS designating the sender M1, M2, S32–S34 of a data item D.

The number n of entries in the filter table F is limited only by the storage area available for the filter table F. The resulting filter table entries are thus $FT_1, FS_1$–$FT_n, FS_n$.

To evaluate the data item D present in the buffer storage area P, the respective passive bus subscriber S32–S34 compares the destination identifier T and the source identifier S of the data item D with the respective filter table entries $FT_1, FS_1$–$FT_n, FS_n$. If one $FT_x, FS_x$ of the filter table entries $FT_1, FS_1$–$FT_n, FS_n$ matches the destination identifier T and the source identifier S of the evaluated data item D, then the respective passive bus subscriber S32–S34, in the case of the communication described by way of example for the passive bus subscriber S32, has found that the data item D is intended for it.

Once the respective passive bus subscriber S32–S34 has found that the data item D is intended for it, it transfers the data item D from the buffer storage area P to its input area E (FIG. 3).

Once the data item D is present in the input area E of the recipient S32, the evaluation and processing of the wanted data N in the data item D start in the conventional manner. The other bus subscribers, for which the data item D was not intended, reject the contents of their buffer storage areas P or do not evaluate the contents.

The entries $FT_1, FS_1$–$FT_n, FS_n$ in the filter table F are obtained in the course of design of the technical installation in which the communication system, with the bus subscribers S32–S34 refined according to the invention, is used.

The filter table thus represents the interdependences between the respective bus subscribers. If, for example, the passive bus subscribers S33 and S34 are sensors or local automation devices for receiving status information about a technical process TP to be controlled or to be monitored, whose status information is required by another local automation device, for example the passive bus subscriber S32, for example for controlling a specific technical apparatus in the process TP, then the design (which was outlined briefly above) of the technical installation ensures that the data delivered by the bus subscriber S33 are evaluated at least by the bus subscriber S32. If the communication system of the specific technical installation has at least one active bus subscriber M1, then the filter table F in the passive bus subscriber S32 contains at least the entry $FT_x$=M1, $FS_x$=S33.

The filter table F can either be defined in a fixed manner in advance for the respective bus subscribers S32–S34 in the course of commissioning the communication system, or else it can be varied retrospectively via a user interface, for example via a coding switch or a keyboard.

The communication relationship made possible by the present invention can also be used advantageously for the situation of data transmission from an active subscriber M1, M2, in this case the master M1, to a passive subscriber S32–S34, in this case the passive subscriber S32.

In the case of data transmission from the active subscriber M1 to the passive subscriber S32, the data item D is supplemented at least by the destination identifier T (T=S32) and the source identifier S (S=M1). The data item D would contain, for example, wanted data N which are intended to be transmitted to all the passive subscribers S32–S34 in order to react to an alarm situation. In the case of conventional data transmission known, the master M1 transmits one and the same data item D with a respectively adapted destination identifier T sequentially and successively to all the passive subscribers S32–S34 involved. In the case of the data transmission which is made possible by the invention, the master M1 transmits the data item D only to one passive subscriber S32, the other passive subscribers S33–S34 receiving the same data item D at the same time as the actual addressee, the subscriber S32, provided that their filter tables F contain the entry $FT_x$=S32, $FS_x$=M1.

This communication relationship is advantageous since the active subscriber M1 has to initiate the transmission of the data item D only once, so that the initiation of the other transmission processes otherwise required is avoided, so that the active subscriber M1 is relieved of the load of communication processes, and the computation time saved is thus available for other purposes.

This communication relationship is furthermore advantageous since both the actual addressee, the passive subscriber S32, and the other passive subscribers S33–S34 with corresponding entries $FT_x$, $FS_x$ in the filter table F receive the data item D at the same time. It is thus possible, for example, to synchronize the passive subscribers S32, S33 and S34. In addition, it is possible to ensure that any alarm action is carried out at the same time by the passive subscribers S32–S34, which would not be possible with the conventional communication known from the prior art, in which the active subscriber M1 transmits the data item D sequentially to all the passive subscribers S32–S34.

In summary, the present invention can be described in brief as follows: a communication subscriber S32–S34 which, as a passive subscriber of a communication system, does not have its own transmission authorization but eavesdrops on all the communication processes can, however, according to the prior art receive only those data items D which are also intended for it, which can be identified without doubt from a destination identifier T allocated to the data items D, is given the capability, according to the present invention, also to receive those data items D whose destination identifier T and source identifier S match an entry FT, FS in the filter table F provided in the communication subscriber S32–S34 which has been given the capability according to the invention. In this way and in an advantageous manner, on the one hand, direct communication is possible between passive communication subscribers S32–S34 and, on the other hand, it is possible for an active and/or passive transmitter M1, M2, S32–S34 to communicate at the same time with a number of passive communication subscribers S32–S34 which have been given the capability according to the present invention.

What is claimed is:

1. A listening communication subscriber comprising:
   a bus system of programmable logic controllers for an industrial control system, wherein the bus system is connected to the listening communication subscriber;
   a unique identifier assigned to the listening communication subscriber; and
   a filter table having at least one entry comprising at least two parameters, a first parameter representing a first destination identifier and a second parameter representing a first source identifier, wherein the listening communication subscriber receives a second destination identifier and a second source identifier corresponding to a data item, and receives and retains the data item when
   i) the second destination identifier and the second source identifier match the first destination identifier and the first source identifier in the filter table and/or
   ii) the second destination identifier matches the unique identifier, wherein the listening communication subscriber is a passive communication subscriber and sends the data item via the bus system to another passive communication subscriber allowing a direct communication between the passive communication subscribers.

2. The listening communication subscriber according to claim 1, further comprising:
   a buffer storage area buffering the data item; and
   an input storage area receiving the data item from the buffer storage area if the data item is to be retained by the listening communication subscriber.

3. The listening communication subscriber according to claim 1, wherein the listening communication subscriber receives and retains the data item only when both,
   i) the second destination identifier and the second source identifier match the first destination identifier and the first source identifier in the filter table, and
   ii) the second destination identifier matches the unique identifier.

4. The listening communication subscriber according to claim 1, wherein the table comprises a plurality of entries, each entry comprising the at least two parameters.

5. A communication system for an industrial control system, comprising:
   a bus system of programmable logic controllers;
   active communication subscribers communicating over the bus system; and
   passive communication subscribers, where the active communication subscribers transmit a data item to one of the passive communication subscribers and at least one of the passive communication subscribers is a listening communication subscriber, a unique identifier being assigned to the listening communication subscriber, wherein the listening communication subscriber comprises a filter table having at least one entry comprising at least two parameters, a first parameter representing a first destination identifier and a second parameter representing a first source identifier, wherein the listening communication subscriber receives a second destination identifier and a second source identifier corresponding to the data item, and receives and retains the data item when
  i) the second destination identifier and the second source identifier match the first destination identifier and the first source identifier, and
  ii) the second destination identifier matches the unique identifier, allowing the listening communication subscriber to receive the data item same as the data item transmitted to the one of the passive communication subscribers, wherein the listening communication subscriber sends the data item via the bus system to another passive communication subscriber allowing a direct communication between the passive communication subscribers.

6. The communication system according to claim 5, wherein the listening communication subscriber further comprises a buffer storage area buffering the data item, and an input storage area receiving the data item from the buffer storage area if the data item is to be retained by the listening communication subscriber.

7. The communication system according to claim 5, wherein the listening communication subscriber receives and retains the data item only when both,
  i) the second destination identifier and the second source identifier match the first destination identifier and the first source identifier in the filter table, and
  ii) the second destination identifier matches the unique identifier.

8. The communication system according to claim 5, wherein the table comprises a plurality of entries, each entry comprising the at least two parameters.

* * * * *